United States Patent
Souissi et al.

(10) Patent No.: US 6,298,233 B1
(45) Date of Patent: Oct. 2, 2001

(54) METHOD AND APPARATUS IN A TWO-WAY WIRELESS COMMUNICATION SYSTEM FOR DETECTION AND DEFERRED REPORTING OF A COMMUNICATION DIFFICULTY

(75) Inventors: Slim Souissi, Fort Worth; Thomas Casey Hill, Trophy Club; Jheroen Pieter Dorenbosch, Paradise, all of TX (US); Carl Bernard Olson, San Carlos, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/373,912

(22) Filed: Aug. 13, 1999

(51) Int. Cl.$^7$ ........................................... H04Q 7/22
(52) U.S. Cl. ............................... 455/423; 455/456
(58) Field of Search ........................ 455/423, 424, 455/425, 456, 455, 67.1, 226.1, 226.2, 115, 62, 510; 342/450, 457

(56) References Cited

U.S. PATENT DOCUMENTS

| 5,095,500 | | 3/1992 | Tayloe et al. . | |
| 5,490,288 | * | 2/1996 | Wiatrowski | 455/54.1 |
| 5,752,164 | * | 5/1998 | Jones | 455/454 |
| 5,781,101 | | 7/1998 | Stephen et al. . | |
| 5,812,636 | * | 9/1998 | Tseng et al. | 455/423 |
| 5,884,163 | * | 3/1999 | Hardouin | 455/423 |
| 5,991,622 | * | 11/1999 | Henry, Jr. | 455/434 |
| 6,070,072 | * | 5/2000 | Dorenbosch et al. | 455/423 |
| 6,198,931 | * | 3/2001 | Smith et al. | 455/445 |
| 6,215,997 | * | 4/2001 | Han | 455/423 |

* cited by examiner

Primary Examiner—Thanh Cong Le
Assistant Examiner—Pablo Tran
(74) Attorney, Agent, or Firm—R. Louis Breeden

(57) ABSTRACT

A portable subscriber unit (122) provides (402) communications for a user, and monitors (404) a parameter indicative of communication quality during the communications. The portable subscriber unit compares (406) the parameter with a predetermined threshold; and when the communication quality deteriorates (408) such that the parameter reaches the predetermined threshold, the portable subscriber unit determines (412) geographic coordinates corresponding to the location at which the communication difficulty occurred, and adds (414) a communication difficulty report identifying the parameter and the geographic coordinates to a record of communication difficulty reports stored in the portable subscriber unit. When the portable subscriber unit receives (502) a request for the record of communication difficulty reports from a fixed portion (102) of a two-way wireless communication system, the portable subscriber unit communicates (504) the record of communication difficulty reports to the fixed portion.

15 Claims, 6 Drawing Sheets

| INCIDENT CODE | LOCATION | DATE & TIME | PARAMETERS |
|---|---|---|---|
| COVERAGE-OUT | XXYY | MODAYRHRMN | RSSI, BER, C/I, C/N, LOBAT |
| COVERAGE-IN | XXYY | MODAYRHRMN | RSSI, BER, C/I, C/N, LOBAT |
| HANDOFF FAIL | XXYY | MODAYRHRMN | RSSI, BER, C/I, C/N, LOBAT |
| RETRIES FAIL | XXYY | MODAYRHRMN | RSSI, BER, C/I, C/N, LOBAT |
| CAPACITY OVLD | XXYY | MODAYRHRMN | ---- |

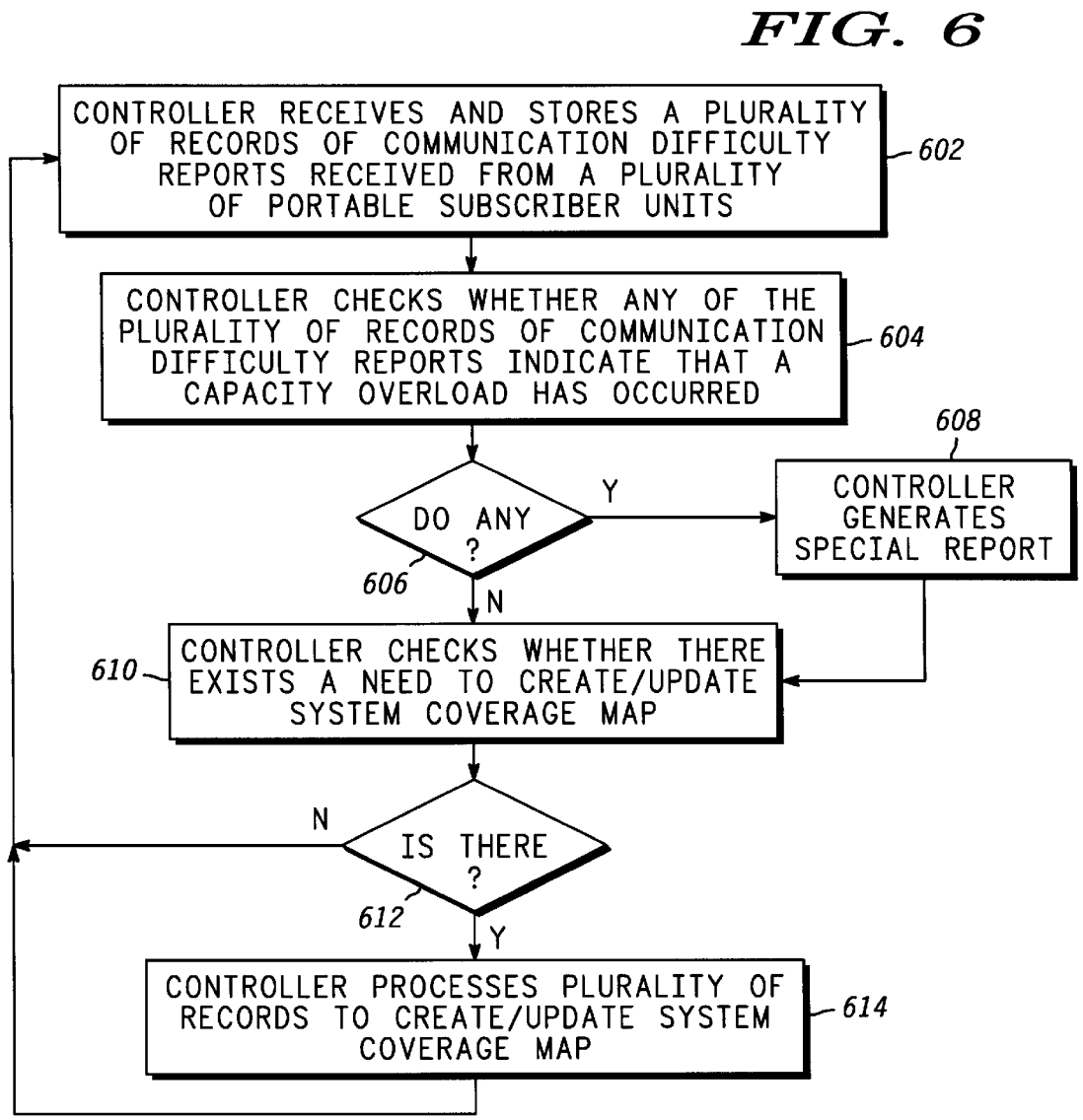

| INCIDENT CODE | LOCATION | DATE & TIME | PARAMETERS |
|---|---|---|---|
| COVERAGE-OUT | XXYY | MODAYRHRMN | RSSI, BER, C/I, C/N, LOBAT |
| COVERAGE-IN | XXYY | MODAYRHRMN | RSSI, BER, C/I, C/N, LOBAT |
| HANDOFF FAIL | XXYY | MODAYRHRMN | RSSI, BER, C/I, C/N, LOBAT |
| RETRIES FAIL | XXYY | MODAYRHRMN | RSSI, BER, C/I, C/N, LOBAT |
| CAPACITY OVLD | XXYY | MODAYRHRMN | ---- |

*FIG. 7*

METHOD AND APPARATUS IN A TWO-WAY WIRELESS COMMUNICATION SYSTEM FOR DETECTION AND DEFERRED REPORTING OF A COMMUNICATION DIFFICULTY

FIELD OF THE INVENTION

This invention relates in general to wireless communication systems, and more specifically to a method and apparatus in a two-way wireless communication system for detection and deferred reporting of a communication difficulty.

BACKGROUND OF THE INVENTION

System coverage is an important aspect of a wireless communication system. Holes in coverage can cause dropped calls and missed messages, which can anger subscribers and cause them to move their business to another service provider. For this reason, many service providers put considerable effort and money into evaluating the coverage performance of their systems to identify and correct areas of bad coverage.

Prior-art diagnostic systems for wireless communication systems have operated to report a communication difficulty either immediately after its occurrence, or as soon as contact is reestablished with a base station. Such "real-time" reporting causes additional traffic in the communication system, with no control of the timing of the additional traffic. Because many communication difficulties, e.g., high interference and congestion, occur during high-traffic conditions, real-time diagnostic reports can exacerbate the problem.

Thus, what is needed is a method and apparatus in a two-way wireless communication system for detection and deferred reporting of a communication difficulty and a location at which the communication difficulty occurred. Preferably, the method and apparatus will be automated, comprehensive, cost effective, and will allow diagnostic reports to be transmitted at off-peak times.

SUMMARY OF THE INVENTION

An aspect of the present invention is a method in a two-way wireless communication system for detection and deferred reporting of a communication difficulty and a location at which the communication difficulty occurred. The method comprises in a portable subscriber unit the steps of providing communications for a user, and monitoring a parameter indicative of communication quality during the communications. The method further comprises the steps of comparing the parameter with a predetermined threshold; and when the communication quality deteriorates such that the parameter reaches the predetermined threshold, performing the steps of determining geographic coordinates corresponding to the location at which the communication difficulty occurred, and adding a communication difficulty report to a record of communication difficulty reports stored in the portable subscriber unit, the communication difficulty report identifying the parameter and the geographic coordinates. The method further comprises in the portable subscriber unit the steps of receiving a request for the record of communication difficulty reports from a fixed portion of the twoway wireless communication system, and communicating the record of communication difficulty reports to the fixed portion in response to the request.

Another aspect of the present invention is a portable subscriber unit in a two-way wireless communication system for detection and deferred reporting of a communication difficulty and a location at which the communication difficulty occurred. The portable subscriber unit comprises a receiver for receiving a first communication from a fixed portion of the two-way wireless communication system, and a processing system coupled to the receiver for processing the first communication. The portable subscriber unit further comprises a transmitter coupled to the processing system for transmitting a second communication to the fixed portion. The processing system is programmed to monitor a parameter indicative of communication quality during at least one of the first and second communications, and to compare the parameter with a predetermined threshold. When the communication quality deteriorates such that the parameter reaches the predetermined threshold, the processing system is further programmed to determine geographic coordinates corresponding to the location at which the communication difficulty occurred, and to add a communication difficulty report to a record of communication difficulty reports stored in the processing system, the communication difficulty report identifying the parameter and the geographic coordinates. The processing system is further programmed to receive a request for the record of communication difficulty reports from a fixed portion of the two-way wireless communication system, and to communicate the record of communication difficulty reports to the fixed portion in response to the request.

Another aspect of the present invention is a controller in a wireless communication system, comprising a network interface for receiving a message from a message originator, and a processing system coupled to the network interface for processing the message. The controller further comprises a base station interface coupled to the processing system for communicating with a portable subscriber unit through a base station. The processing system is programmed to receive and store a plurality of records of communication difficulty reports received from a plurality of portable subscriber units, and to process the plurality of records to create a system coverage map.

BRIEF DESCRIPTION OF THE DRAWINGS

FIG. 5 is a flow diagram depicting operation of the portable subscriber unit in accordance with a second aspect of the present invention.

FIG. 6 is a flow diagram depicting operation of the controller in accordance with a third aspect of the present invention.

FIG. 7 is diagram depicting an exemplary structure for the record of communication difficulty reports in accordance with the present invention.

DETAILED DESCRIPTION OF THE DRAWINGS

Figure 1:
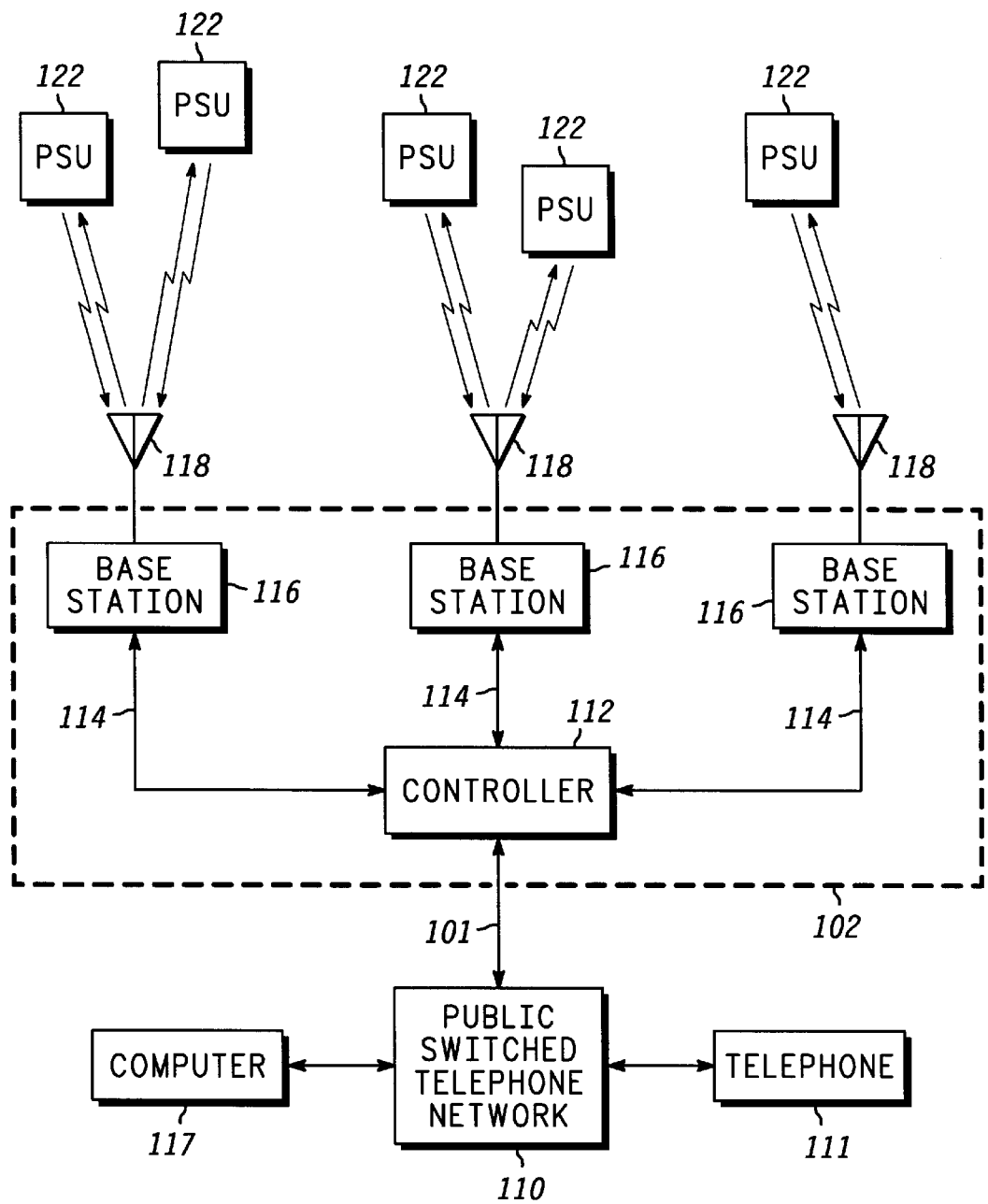
FIG. 1 is an electrical block diagram of an exemplary wireless communication system in accordance with the present invention.

Referring to FIG. 1, an electrical block diagram depicts an exemplary wireless communication system in accordance with the present invention, comprising a fixed portion 102 including a controller 112 and a plurality of conventional base stations 116, the communication system also including a plurality of portable subscriber units 122. The base stations 116 preferably communicate with the portable subscriber units 122 utilizing conventional radio frequency (RF) techniques, and are coupled by conventional communication links 114 to the controller 112, which controls the base stations 116.

The hardware of the controller 112 is preferably a combination of a Choreographer!™ network management device, a Wireless Messaging Gateway (WMG™) Administrator!™ terminal, an RF-Usher!™ multiplexer, and an RF-Conductor!™ message distributor manufactured by Motorola, Inc., and utilizes software modified in accordance with the present invention. The hardware of the base stations 116 is preferably a combination of the RF-Orchestra!™ transmitter and the RF-Audience!™ receiver manufactured by Motorola, Inc. The portable subscriber units 122 are preferably similar to PageWriter™ 2000 data portable subscriber units, also manufactured by Motorola, Inc., and also utilize software modified in accordance with the present invention. It will be appreciated that other similar hardware can be used as well for the controller 112, the base stations 116, and the portable subscriber units 122.

Each of the base stations 116 transmits RF signals to the portable subscriber units 122 via an antenna 118. The base stations 116 preferably each receive RF signals from the plurality of portable subscriber units 122 via the antenna 118. The RF signals transmitted by the base stations 116 to the portable subscriber units 122 (outbound messages) comprise selective call addresses identifying the portable subscriber units 122, and data messages originated by a message originator, as well as commands originated by the controller 112 for adjusting operating parameters of the radio communication system. The RF signals preferably transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests and requests for items of information. It will be appreciated that, alternatively, another wireless communication technology, e.g., infrared technology, can be used to communicate between the base stations 116 and the portable subscriber units 122.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations. It will be further appreciated that the computer 117 can also function as a server for providing various applications and information utilized by the wireless communication system. In that mode, the computer 117 preferably is coupled directly to the controller 112 without going through the PSTN.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. It will be further appreciated that the present invention is applicable to many different types of wireless communication systems, including cellular telephone systems, trunked dispatch systems, and voice and data messaging systems, to name a few.

Figure 2:
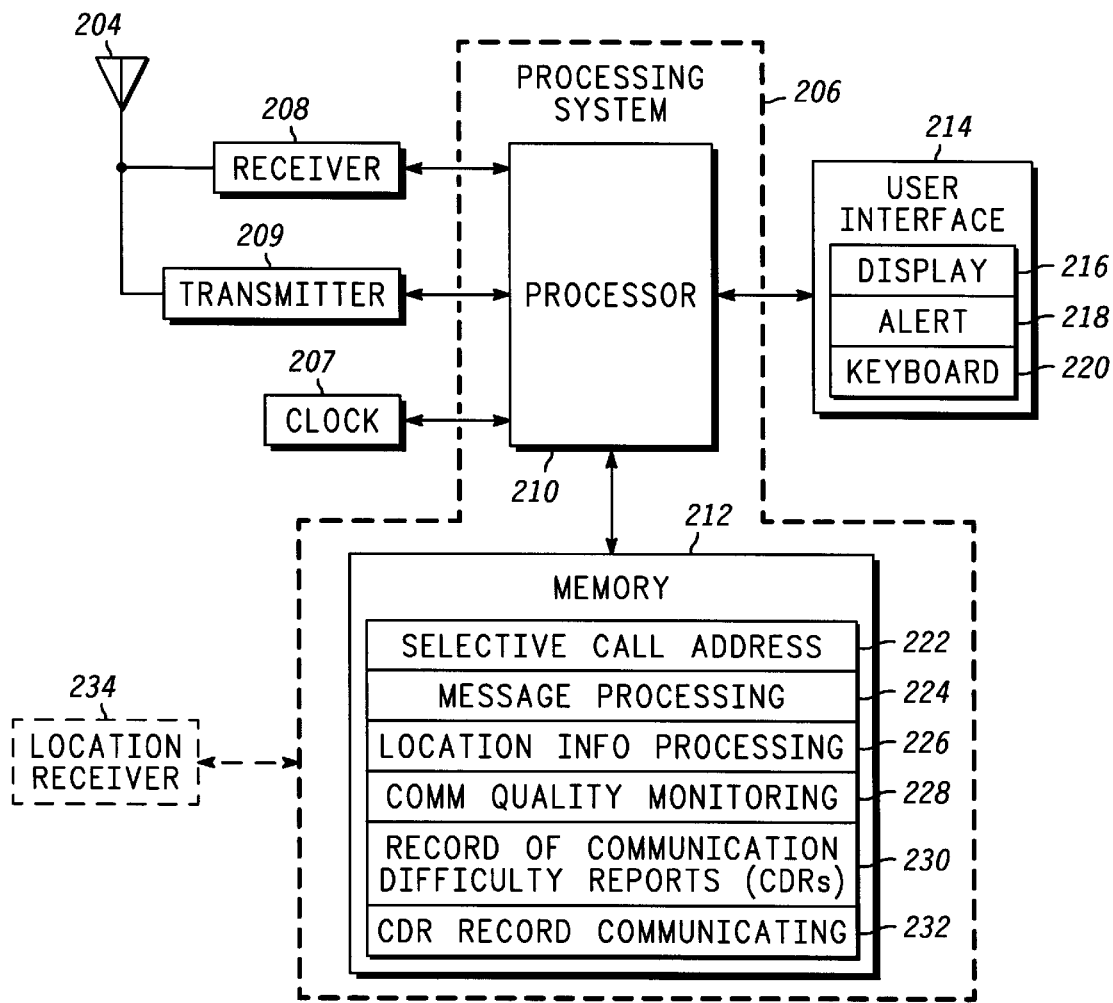
FIG. 2 is an electrical block diagram of an exemplary portable subscriber unit in accordance with the present invention.

FIG. 2 is an electrical block diagram of an exemplary portable subscriber unit 122 in accordance with the present invention. The portable subscriber unit 122 comprises an antenna 204 for intercepting an outbound message and for transmitting an inbound message. The antenna 204 is preferably coupled to a conventional receiver 208 for receiving the outbound message and is coupled to a conventional transmitter 209 for transmitting the inbound message. The receiver 208 and transmitter 209 are coupled to a processing system 206 for processing the outbound and inbound messages and for controlling the portable subscriber unit 122 in accordance with the present invention. A user interface 214 preferably is also coupled to the processing system 206 for interfacing with a user. The user interface 214 comprises a conventional keyboard 220 for requesting that an operation be performed and for controlling the portable subscriber unit 122, a conventional display 216 for displaying the inbound and outbound messages, and a conventional alert element 218 for alerting the user when an outbound message arrives. A conventional clock 207 is also coupled to the processing system 206 for supporting time keeping requirements of the portable subscriber unit 122.

The processing system 206 comprises a conventional processor 210 and a conventional memory 212. The memory 212 comprises software elements and data for programming the processing system 206 in accordance with the present invention. The memory 212 preferably includes a selective call address 222 to which the portable subscriber unit 122 is responsive. In addition, the memory 212 includes a message processing element 224 for programming the processing system 206 to process messages through well-known techniques. The memory 212 further comprises a location information processing program 226 for programming the processing system 206 to cooperate with the controller 112 to process location information through well-known techniques, such as location determination that uses the resources of the wireless communication system itself. It may be based on tokens (TX ID, zone, Local Area ID) or on the measurement of timing, RSSI, and the like.

The memory 212 also includes a communication quality processing program 228 for programming the processing system to perform the communication quality processing in accordance with the present invention. The memory 212 also includes space for storing a record of communication difficulty reports (CDRs) 230 generated by the processing system 206 in accordance with the present invention. The memory 212 further comprises a CDR record communicating program 232 for communicating the record of CDRs 230 to the fixed portion 102. In one embodiment, the portable subscriber unit 122 also includes a location receiver 234 such as a Global Positioning System (GPS) receiver, coupled to the processing system 206 for helping determine the location information through well-known techniques, Operation of the portable subscriber unit 122 in accordance with the present invention will be described in detail further below.

Figure 3:
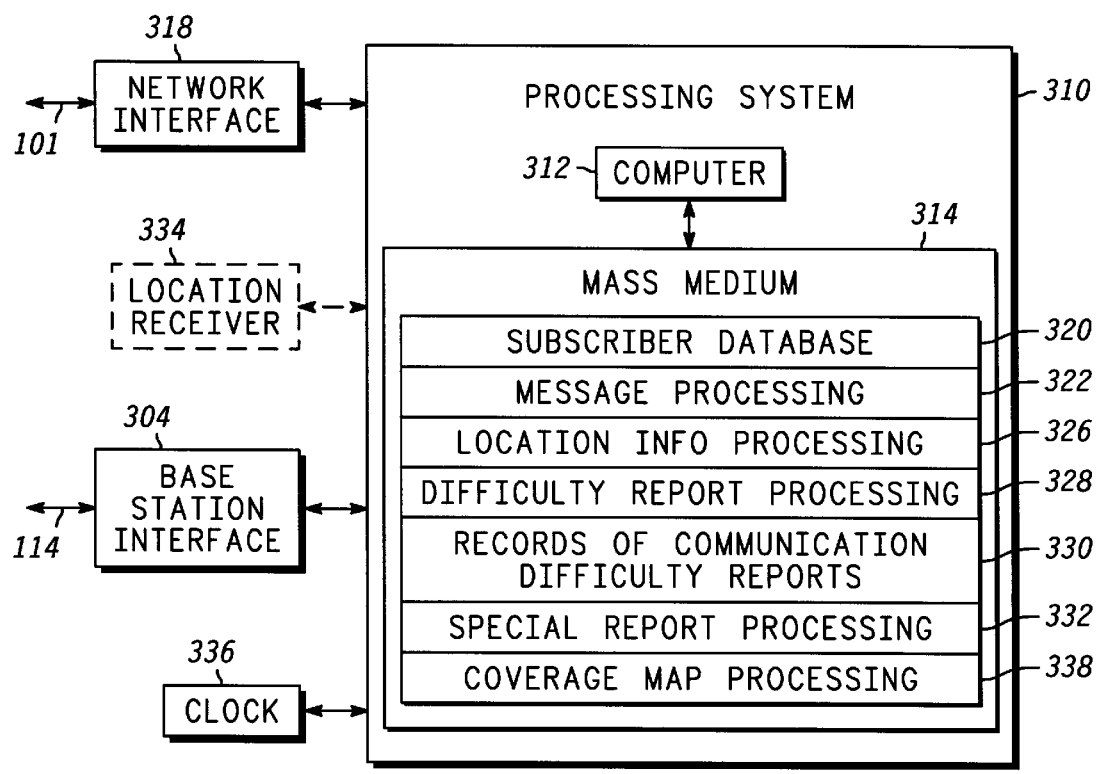
FIG. 3 is an electrical block diagram of an exemplary controller in accordance with the present invention.

FIG. 3 is an electrical block diagram depicting an exemplary controller 112 in accordance with the present invention. The controller 112 comprises a network interface 318 for receiving a message from a message originator via the telephone links 101. The network interface 318 is coupled to a processing system 310 for controlling and communicating with the network interface 318. The processing system is coupled to a base station interface 304 for controlling and communicating with the base stations 116 via the communication links 114. The processing system 310 is also coupled to a conventional clock 336 for providing a timing signal to the processing system 310. The processing system 310 comprises a conventional computer 312 and a conventional mass medium 314, e.g., a magnetic disk drive, programmed with information and operating software in accordance with the present invention. The mass medium 314 comprises a conventional subscriber database 320 for storing profiles defining service for subscribers using the system. The mass medium 314 further comprises a message processing element 322 for processing messages through well-known techniques.

The mass medium 314 also includes a location information processing program 326 for programming the processing system 310 to cooperate with the portable subscriber unit 122 to process location information through well-known techniques. The mass medium 314 also includes a difficulty report processing program 328 for programming the processing system 310 to process a plurality of records of communication difficulty reports 330 in accordance with the present invention. The mass medium 314 further comprises space for storing the records of communication difficulty reports 330. In addition, the mass medium 314 includes a special report processing program 332 for generating a special report when one of the records of communication difficulty reports 330 indicates that a capacity overload has occurred.

Detection of a capacity overload by the portable subscriber unit depends upon the type of system. For example, in an analog cellular telephone system, capacity overload occurs when no channel is available for a portable subscriber unit desiring to communicate. In a two-way messaging system using an ALOHA technique for the inbound channel, capacity overload can be indicated when more than a predetermined number of retries are necessary to establish contact. In a CDMA system, capacity overload can be determined by a "busy" signal encountered while attempting to originate a call; (C/I is also an indicator).

The mass medium 314 also includes a coverage map processing program 338 for programming the processing system 310 to create a coverage map from the plurality of records of communication difficulty reports 330 in accordance with the present invention.

It will be appreciated that, alternatively, some of the elements described above as being included in the mass medium 314 can instead be located on a server coupled to the wireless communication system via a network, such as the Internet. In one embodiment, the controller 112 also includes a location receiver 334, such as a GPS receiver, for helping determine the location information through well-known techniques. Operation of the controller 112 in accordance with the present invention will be described further below.

Figure 4:
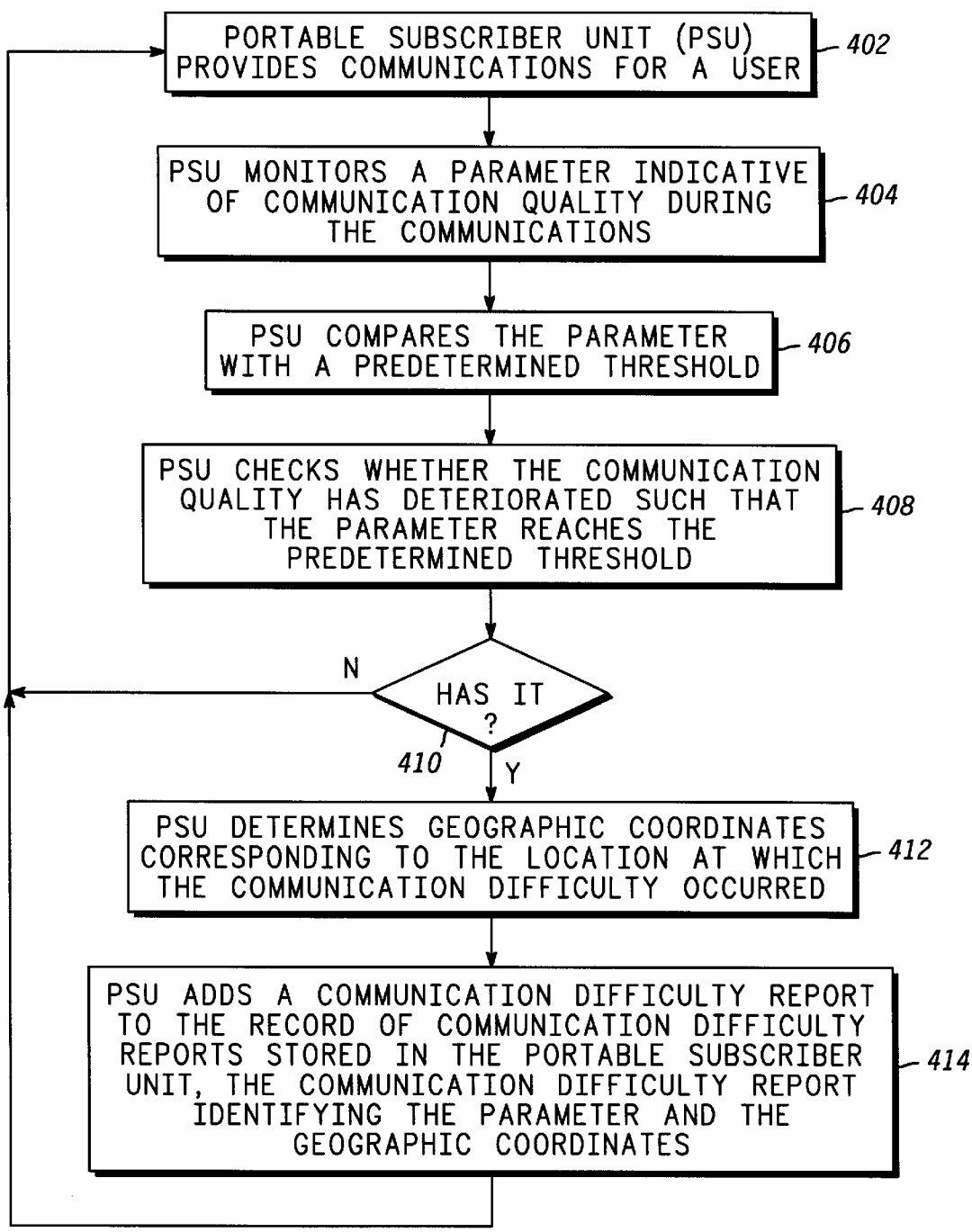
FIG. 4 is a flow diagram depicting operation of the portable subscriber unit in accordance with a first aspect of the present invention.

FIG. 4 is a flow diagram depicting operation of the exemplary portable subscriber unit 122 in accordance with a first aspect of the present invention. The flow begins when the portable subscriber unit 122 provides 402 communications for a user, including communications on behalf of a user while in the portable subscriber unit 122 is in an idle state. In the idle state, the unit can monitor the outbound channel. It also has many opportunities to monitor the inbound channel such as, for example, when it enters a new local area, zone, or subzone, it will register or otherwise notify the system.

During the communications, the portable subscriber unit 122 monitors 404 a parameter indicative of the communication quality. The parameter preferably is selected from a group of parameters consisting of a bit error rate (BER), a received signal strength indication (RSSI), a carrier-to-interference ratio (C/I), a carrier-to-noise ratio (C/N), a carrier-to-interference plus noise ratio (C/(I+N)), whether a hand-off succeeds, whether one of the communications is interrupted, latency, delay spread, neighboring power levels, a battery parameter, a capacity overload, and number of retries required to establish contact.

The portable subscriber unit 122 then compares 406 the parameter with a predetermined threshold, and checks 408 whether the communication quality has deteriorated such that the parameter has reached the predetermined threshold. If not, at step 410 the flow returns to step 402. If, on the other hand, the parameter has reached the predetermined threshold, the flow moves to step 412, where the portable subscriber unit 122 determines the geographic coordinates corresponding to the location at which the communication difficulty occurred, using well-known techniques for position determination. The portable subscriber unit 122 then adds 414 a communication difficulty report to the record of communication difficulty reports 230, the report identifying the parameter and the geographic coordinates.

It will be appreciated that well-known techniques can be employed to limit the amount of data storage required in the portable subscriber unit 122. For example, one such technique would be to allow only one communication difficulty report to be saved in the portable subscriber unit 122 for a given set of geographic coordinates or for any other location within a predetermined distance of said set of geographic coordinates.

It will be further appreciated that whenever the portable subscriber unit 122 has at least one report in the record of communication difficulty reports 230, the portable subscriber unit 122 preferably indicates, to the controller 112, upon registering with a coverage zone, that the portable subscriber unit 122 has a communication difficulty to report, e.g., by setting a predetermined bit in the registration data. That way, the controller 112 advantageously can schedule a request, at a next available off-peak time, for the portable subscriber unit 122 to upload the information. Also, the controller 112 advantageously will not have to blindly poll all portable subscriber units 122 operating in the system, whether or not they have any communication difficulties to report.

The portable subscriber unit 122 also preferably timestamps the communication difficulty report with the time at which the difficulty occurred. In addition, the portable subscriber unit 122 preferably records in the communication difficulty report a value of at least one additional parameter monitored during the communications to help determine a cause for the communication difficulty. For example, in addition to reporting RSSI and BER, the portable subscriber unit 122 can report a low battery condition. It will be appreciated that the parameters of both the outbound channel and the inbound channel are preferably monitored, compared, and checked to create communication difficulty reports for both channels.

It will also be appreciated that there can be known outages which are undergoing repair or have already been repaired, Deferred communication difficulty reports resulting from such known outages may be considered by the service provider to be of no value. Thus, through well-known techniques, a command message preferably is provided that can be used by the service provider to clear all, or selected types of, communication difficulty reports which originated in the vicinity of the known outage during a time period over which the outage existed (or is expected to exist). This command message can be sent as a broadcast message to all the portable subscriber units 122 to prevent a flood of useless communication difficulty reports.

FIG. 5 is a flow diagram depicting operation of the portable subscriber unit 122 in accordance with a second aspect of the present invention. The flow begins when the portable subscriber unit 122 preferably receives 502 a request for the record of communication difficulty reports 230 from the fixed portion 102. Preferably, the request is made during off-peak times, so that additional traffic will not be created during peak traffic hours. In response, the portable subscriber unit 122 communicates 504 the record of communication difficulty reports 230 to the fixed portion 102, along with the identity of the portable subscriber unit 122. After the communication is acknowledged by the fixed portion, the portable subscriber unit 122 then preferably clears the record of communication difficulty reports 230, so that the same reports will not be retransmitted later. It will be appreciated that, alternatively, the portable subscriber unit 122 can determine that the record of communication difficulty reports contains a number of communication difficulty reports that has reached a predetermined maximum. In response, the portable subscriber unit 122 then communicates the record of communication difficulty reports to the fixed portion.

It will be further appreciated that the portable subscriber unit 122 can receive a request from the fixed portion to monitor and report a signal quality when entering a pre-defined geographic zone. In response, the portable subscriber unit 122 monitors and reports the signal quality when entering the pre-defined geographic zone. This feature is useful, for example, when the service provider has identified a zone suspected of having a coverage problem which is in need of evaluation.

FIG. 6 is a flow diagram depicting operation of the controller 112 in accordance with a third aspect of the present invention. The flow begins when the controller 112 receives and stores 602 a plurality of records of communication difficulty reports 330 received from the plurality of portable subscriber units 122. The controller 112 then checks 604 whether any of the plurality of records of communication difficulty reports 330 indicate that a capacity overload has occurred. If so, the controller 112 generates 608 a special report, so that the service provider can plan for capacity adjustments to the wireless communication system in the vicinity of the reported location.

In any event, the flow then moves to step 610, where the controller 112 checks whether there is a need to create or update the system coverage map. The need can be generated, for example, by a manual request from the service provider. Alternatively, the controller 112 can generate an new/updated system coverage map automatically at a predetermined time each day. If there is a need, at step 612 the flow advances to step 614, where the controller 112 processes the plurality of records 330 to create or update the system coverage map. In either case, the flow then returns to step 602. Thus, the service provider advantageously is informed of locations that are experiencing coverage problems and can take measures to correct the coverage problems quickly.

It will be appreciated that for portable subscriber units 122 equipped with displays of adequate resolution, the system coverage map (or portions thereof) also can be transmitted to the portable subscriber units 122. This feature could, for example, help users avoid areas of poor coverage, or be used by service providers while making system adjustments in the field.

FIG. 7 is diagram depicting an exemplary structure for the record of communication difficulty reports 230 in accordance with the present invention. Each row 702 represents a communication difficulty report, comprising an incident code 704, an incident location 706, date and time 708 of the incident, and parameters 710 which are relevant to the report. It will be appreciated that additional columns can be used for providing any additional desired information.

Thus, it should be clear from the preceding disclosure that the present invention advantageously provides a method and apparatus in a two-way wireless communication system for detection and deferred reporting of a communication difficulty and a location at which the communication difficulty occurred. Advantageously, the method and apparatus is automated, comprehensive, cost effective, and allows diagnostic reports to be transmitted at off-peak times.

Many modifications and variations of the present invention are possible in light of the above teachings. Thus, it is to be understood that, within the scope of the appended claims, the invention can be practiced other than as specifically described herein above.

What is claimed is:

1. A method in a two-way wireless communication system for detection and deferred reporting of a communication difficulty and a location at which the communication difficulty occurred, the method comprising in a portable subscriber unit the steps of:

provide communications for a user;

monitoring a parameter indicative of communication quality during the communications;

comparing the parameter with a predetermined threshold; and when the communication quality deteriorates such that the parameter reaches the predetermined threshold, performing the steps of:

determining geographic coordinates corresponding to the location at which the communication difficulty occurred; and adding a communication difficulty report to a record of communication difficulty reports stored in the portable subscriber unit, the communication difficulty report identifying the parameter and the geographic coordinates, and wherein the method further comprises in the portable subscriber unit the steps of:

receiving a request for the record of communication difficulty reports from a fixed portion of the two-way wireless communication system; and communicating the record of communication difficulty reports to the fixed portion in response to the request.

2. The method of claim 1, further comprising in the fixed portion of the wireless communication system the steps of:

receiving and storing a plurality of records of communication difficulty reports received from a plurality of portable subscriber units; and processing the plurality of records to create a system coverage map.

3. The method of claim 1, wherein the adding step comprises the step of time-stamping the communication difficulty report.

4. The method of claim 1,
wherein the communications occur on both an inbound channel and an outbound channel, and
wherein the monitoring, comparing, and performing steps are done for both the inbound channel and the outbound channel.

5. The method of claim 1, wherein the monitoring step comprises the step of
monitoring the parameter selected from a group of parameters consisting of a bit error rate, a received signal strength indication, a carrier-to-interference ratio, a carrier-to-noise ratio, a carrier-to-interference plus noise ratio, whether a hand-off succeeds, whether one of the communications is interrupted, latency, delay spread, neighboring power levels, a battery parameter, a capacity overload, and number of retries required to establish contact.

6. The method of claim 1, wherein the adding step comprises the step of
recording in the communication difficulty report a value of at least one additional parameter monitored during the communications to help determine a cause for the communication difficulty.

7. The method of claim 1, further comprising in the portable subscriber unit the steps of:
determining that the record of communication difficulty reports contains a number of communication difficulty reports, the number having reached a predetermined maximum; and
communicating the record of communication difficulty reports to the fixed portion in response to the number having reached the predetermined maximum.

8. The method of claim 1, further comprising in the portable subscriber unit the steps of:
receiving a request from the fixed portion to monitor and report a signal quality when entering a pre-defined geographic zone; and
monitoring and reporting the signal quality when entering the pre-defined geographic zone.

9. The method of claim 1, further comprising in the fixed portion of the wireless communication system the steps of:
generating a special report when the record of communication difficulty reports indicates that a capacity overload has occurred.

10. A portable subscriber unit in a two-way wireless communication system for detection and deferred reporting of a communication difficulty and a location at which the communication difficulty occurred, the portable subscriber unit comprising:
a receiver for receiving a first communication from a fixed portion of the two-way wireless communication system;
a processing system coupled to the receiver for processing the first communication; and
a transmitter coupled to the processing system for transmitting a second communication to the fixed portion,
wherein the processing system is programmed to:
monitor a parameter indicative of communication quality during at least one of the first and second communications,
compare the parameter with a predetermined threshold; and
when the communication quality deteriorates such that the parameter reaches the predetermined threshold:
determine geographic coordinates corresponding to the location at which the communication difficulty occurred; and
add a communication difficulty report to a record of communication difficulty reports stored in the processing system, the communication difficulty report identifying the parameter and the geographic coordinates, and
wherein the processing system is further programmed to:
receive a request for the record of communication difficulty reports from a fixed portion of the two-way wireless communication system; and
communicate the record of communication difficulty reports to the fixed portion in response to the request.

11. The portable subscriber unit of claim 10, wherein the processing system is further programmed to time-stamp the communication difficulty report.

12. The portable subscriber unit of claim 10, wherein the processing system is further programmed to
monitor the parameter selected from a group of parameters consisting of a bit error rate, a received signal strength indication, a carrier-to-interference ratio, a carrier-to-noise ratio, a carrier-to-interference plus noise ratio, whether a hand-off succeeds, whether one of the communications is interrupted, latency, delay spread, neighboring power levels, a battery parameter, a capacity overload, and number of retries required to establish contact.

13. The portable subscriber unit of claim 10, wherein the processing system is further programmed to
record in the communication difficulty report a value of at least one additional parameter monitored during the communications to help determine a cause for the communication difficulty.

14. The portable subscriber unit of claim 10, wherein the processing system is further programmed to:
determine that the record of communication difficulty reports contains a number of communication difficulty reports, the number having reached a predetermined maximum; and
communicate the record of communication difficulty reports to the fixed portion in response to the number having reached the predetermined maximum.

15. The portable subscriber unit of claim 10, wherein the processing system is further programmed to:
receive a request from the fixed portion to monitor and report a signal quality when entering a pre-defined geographic zone; and
monitor and report the signal quality when entering the pre-defined geographic zone.

* * * * *